United States Patent [19]
Clingan

[11] 3,958,356
[45] May 25, 1976

[54] ENCLOSED MINNOW DIPPER WITH AUTOMATIC ACCESS DOOR

[76] Inventor: Andrew J. Clingan, 2402 Phillips Lane, Texarkana, Tex. 75501

[22] Filed: Aug. 4, 1975

[21] Appl. No.: 601,752

[52] U.S. Cl............................................. 43/4; 43/56
[51] Int. Cl.² ........................................ A01K 97/04
[58] Field of Search ................................ 43/4, 56

[56] References Cited
UNITED STATES PATENTS

| | | | |
|---|---|---|---|
| 2,082,754 | 6/1937 | Peterson | 43/56 |
| 2,480,924 | 9/1949 | Heger | 43/4 |
| 2,531,551 | 11/1950 | Brecht et al. | 43/4 |
| 2,670,557 | 3/1954 | Pachner | 43/4 |

Primary Examiner—Louis G. Mancene
Assistant Examiner—Daniel J. Leach
Attorney, Agent, or Firm—Ralph R. Pittman

[57] ABSTRACT

A dipper for minnows has a cup portion in the shape of a cage-like pentahedral prism of transparent plastic material and is fitted with a normally closed flotation-actuated access door on the rear wall. The forward panel and the rear wall of the enclosure each have a set of downwardly directed teeth along their respective lower and adjacent margins to facilitate fastening a caught minnow on a fishhook, the forward panel being swingably movable to permit the hooked minnow to be removed from the cup.

11 Claims, 5 Drawing Figures

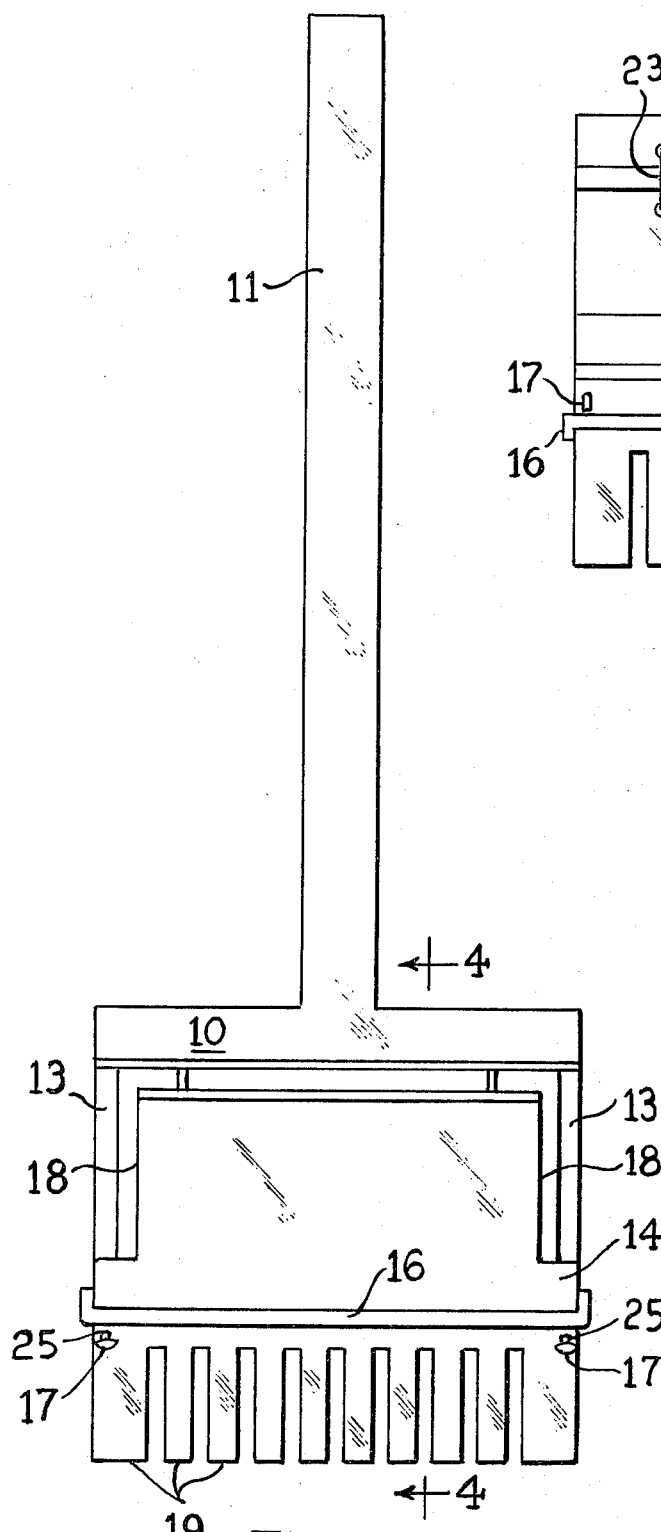
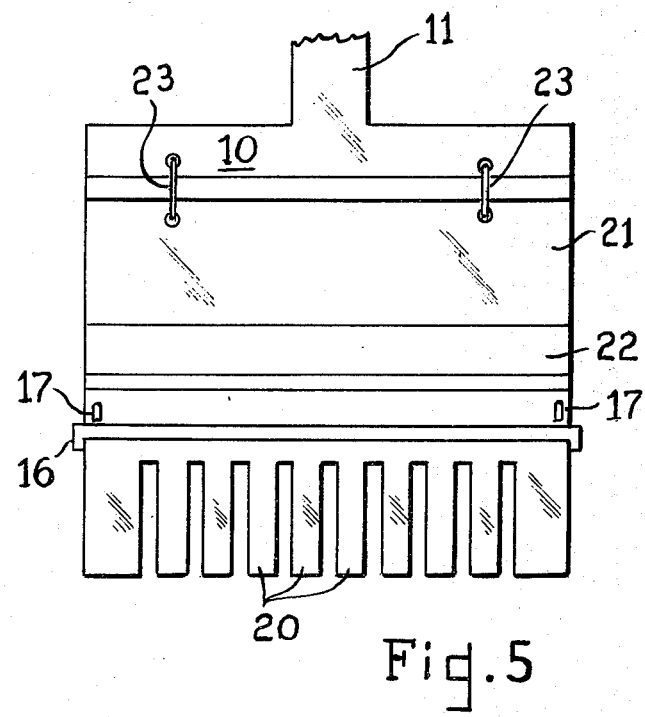
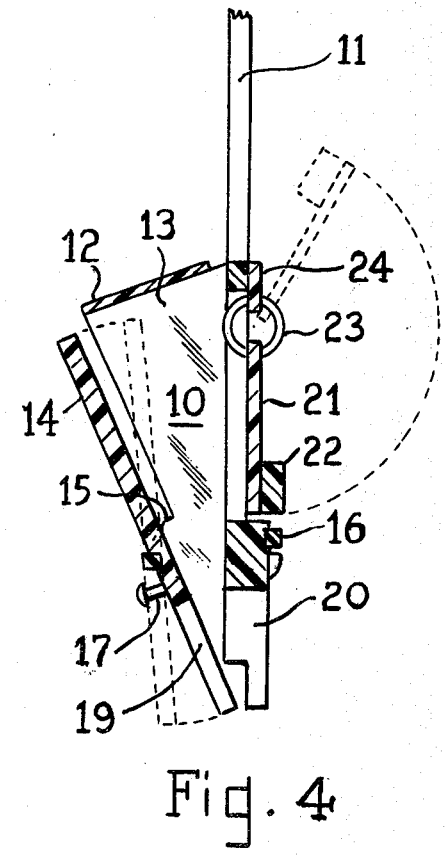

ENCLOSED MINNOW DIPPER WITH AUTOMATIC ACCESS DOOR

BACKGROUND

Live minnows, a widely used fish bait, are usually transported to a fishing location in some type of water-containing minnow buckets. To properly bait a fishhook with a minnow, it is necessary to first remove the minnow from the water with some sort of dipping device, orient the minnow in the direction to conveniently pass the barbed end of the fishhook transversely through the minnow, and then remove the baited hook from the dipping device.

A problem common to all open-top minnow dippers is that of confining the dipped minnow so that it cannot flounce out of the dipper before it can be impaled on a fishhook. Certain opentop minnow dippers are sufficiently deep to preclude self-ejection of the minnow, such dippers requiring long-handled tongs for reaching and holding the minnow.

Other previously described open-top dippers are constructed as a combination having an embodied tongs or other minnow-clasping members, such constructions are useful in the baiting of the hook, but only after the minnow has in some way been restrained from flopping out of the dipper.

SUMMARY OF THE INVENTION

The minnow dipper described herein utilizes a normally closed flotation-actuated access door in the rear wall of an upstanding five-sided, wedge-shaped cage-like cup for capturing a minnow therein, the forward panel of the enclosed cup being fulcrumly mounted to reciprocably swing the lower margin thereof toward and away from the adjacent lower margin of the rear wall, to thereby provide a second opening to the interior wedge-shaped cavity, the latter opening being directed downwardly therefrom.

Sets of complementary teeth are spaced respectively along the lower margins of the rear wall and the forward panel, the upwardly extending interspaces between the opposing teeth being in registration to permit the passage of a fishhook transversely through a minnow disposed in the lower V-shaped portion of the cavity. A movement of the forward panel permits the removal of the baited fishook from the interior cavity of the dipper.

All of the enclosing members, as well as the handle, are preferably of some material having the same colorlessness and clarity as water; an example of such material is Plexiglas.

BRIEF DESCRIPTION OF THE DRAWING

FIG. 3 is a front elevation showing the offsets in the forward swingable panel and the teeth along the lower margin of the forward panel;

FIG. 4 is a fragmentary section taken along the line 4—4 of FIG. 3, the broken lines indicating the respective paths of movement of the swingably mounted forward panel and the rear access door; and FIG. 5 is a rear elevation, showing the rear hinged flotation-actuated door and the teeth along the lower margin of the rear wall, a part of the handle being not shown.

DESCRIPTON OF THE PREFERRED EMBODIMENT

Figure 2:
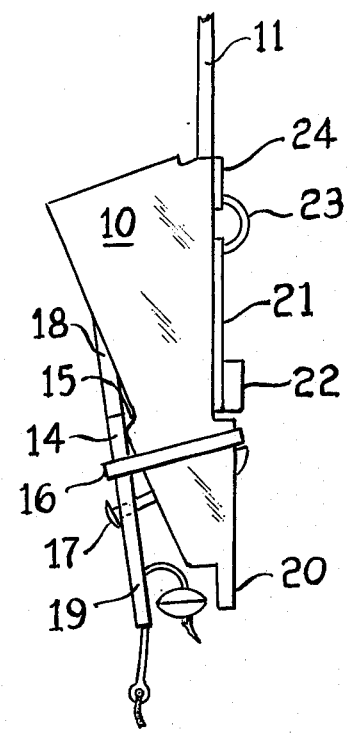
FIG. 2 shows the closed access door following the removal of the dipper from the bucket, the minnow having been impaled on a fishhook and in position to move downwardly from the interior of the cup through the opening resulting from a swingable movement of the forward panel of the cup.
Figure 1:
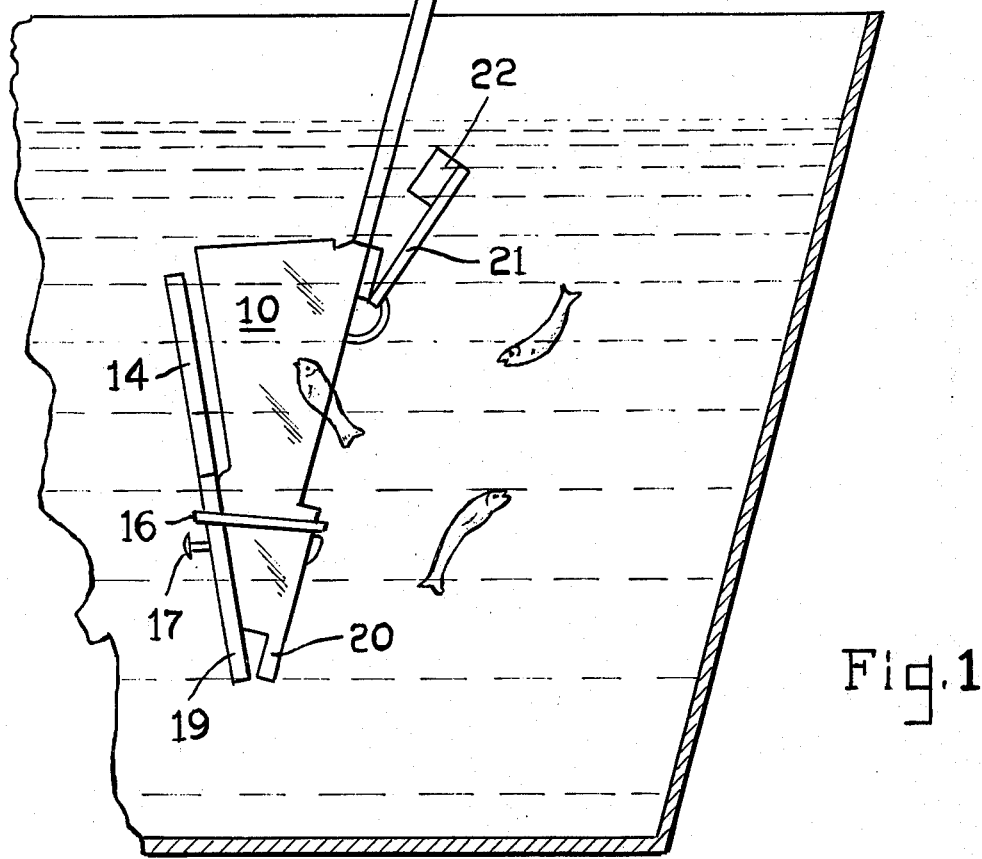
FIG. 1 is a side elevation of the dipper as it appears immersed in a minnow bucket, the flotation-actuated access door having opened in response to the immersion, a minnow being shown entering the interior cavity of the wedge-shaped cup.

In the drawing, FIGS. 1 and 2 illustrates the dipper in service; FIGS. 3, 4 and 5 show in more detail the structural members and their relationship.

The dipper is conveniently constructed of three principal enclosing members; namely, (1) the generally wedge-shaped body portion 10 including a back wall from which the handle 11 is extended, the forwardly directed triangular side panels 13, and the top closure panel 12; (2) the swingably mounted forward panel 14; and (3) the rear access door 21.

The dipper cup formed by the above-mentioned closure members is a cage-like enclosure in the shape of an inverted pentahedral triangular prism defining an interior downwardly tapering wedge-shaped cavity.

Access by minnows to the interior of the cup is through an opening in the rear wall of the body portion 10, the opening being normally closed by the transversely extending door 21, which swingably depends from the superjacent transversely extending support panel 24 through the ring hinges 23.

Along the outer surface of the lower margin of the door 21 is affixed a strip of buoyant material 22, the latter being effective to cause the door 21 to swing to the open position concurrently with a predetermined directional immersion of the dipper cup in water. One suitable material for use as the buoyant strip is Styrofoam.

Equal upper portions of the forward margins of the triangular side panels 13 are set back at the fulcrum step 15, and equal portions of the lateral margins of the forward panel 14 are offset as indicated at the numerals 18 to permit the upper offset portions of the front panel 14 to enter the wedge-shaped cavity of the cup as the front panel 14 swings from the fulcrum step 15.

A tensioned elastic band 16 extends peripherally around a portion of the cup below the fulcrum step 15, normally resiliently holding the front panel 14 in engagement with the non-offset margins of the side panels 13, and a pair of transversely opposed parallel extending motion-limiting guide pins 17 and rigidly secured to the body portion 10 below the elastic band 16, extending forwardly through and beyond registering apertures 25 in the marginal portions of the front panel 14, the swingable movement of the latter being limited by the projected heads of the guide pins 17.

The respective adjacent lower margins of the rear wall of the body portion 10 and the panel 14 are formed as equally spaced downwardly directed complementary sets of teeth 19 and 20, the upwardly extending recesses defined by the interspaces being of like dimensions and in mutual registration.

In use, the dipper is first tilted slightly in a clockwise direction to assure that the flotation-actuated door will swing upwardly to open concurrently with the immersion of the cup in water. FIG. 1 illustrates the dipper in use in a minnow bucket, the door having opened to permit the ingress of a minnow.

After a minnow has entered the cup, the dipper is tilted slightly in a counterclockwise direction before being withdrawn from the water, to enable the door to close during withdrawal and thus confine the minnow within the enclosed cavity.

All water drains from the dipper as it is retracted, and the minnow falls into the lower tapering toothed portion of the cup, enabling the convenient lateral impalment of the minnow by a fishhook. As shown at FIG. 2, as the upper offset portion of the forward panel 14 is manually pressed rearwardly into the cup cavity, the toothed lower margin 19 of the forward panel swings about the fulcrum 15 and away from the toothed lower margin 20 of the rear wall to open the bottom of the cup cavity, through which the baited fishhook may be withdrawn.

Upon release, the swingable forward panel 14 is biased to its normal cavity-closing position by the elastic band 16, and with the rear access door in the normally closed position, the dipper is ready for further use.

What is claimed is:

1. A minnow dipper comprising;
a normally enclosed cup in the form of a hollow inverted triangular prism;
the rectangular rear wall of said cup having an intermediate access opening extending between the sides of the cup and a first array of spaced downwardly extending teeth along the lower margin;
the rectangular front panel being attached to and substantially covering the forward face of the cup and having a second array of spaced downwardly directed teeth along the lower margin in spatially adjacent registration with said first array of teeth;
a door disposed to normally close said access opening, hinge means suspending said door from the superjacent body portion and buoyant means fixed to said door;
said buoyant means being effective to open said door concurrently with the immersion of said cup in water when said cup is disposed in a predetermined angular relationship with a vertical plane; and
a manipulative handle extending outwardly from the upper margin of said rear wall.

2. The dipper claimed in claim 1, wherein said buoyant means is disposed along the lower margin of said access door.

3. The dipper in accordance with claim 2, in which said buoy ant means is a strip of Styrofoam.

4. The dipper as defined in claim 1, wherein all of the enclosing structural members are clear and transparent plastic material.

5. The dipper as claimed in claim 1, in which the attachment means associated with said front panel is a fulcrumed mounting effective to permit reciprocable movement of said second array of teeth with respect to said first array of teeth.

6. A minnow dipper for dipping and subsequently facilitating the attachment of a minnow to a fishhook, the cup of the dipper normally comprising:
a pentahedral enclosure in the shape of a hollow inverted triangular prism including a movable forward panel and a fixed rear wall;
a normally closed access door mounted on said rear wall and buoyant means secured to said door effective to open said door concurrently with a predetermined directional immersion of the cup in water;
said movable forward panel being fulcrumed intermediate the ends thereof on the forward edges of the respective triangular sides of said enclosure;
mounting means holding said movable forward panel against said forward edges, said mounting means permitting limited swingable movement of said forward panel with respect to said rear wall;
a first set of downwardly directed teeth spaced along the lower margin of said rear wall and a second set of corresponding teeth spaced along the lower margin of the swingable forward panel in spatially adjacent relation with said first set of teeth;
said swingable movement of the forward panel effecting limited reciprocable movement of said second set of teeth with respect to said first set of teeth.

7. The dipper as set forth in claim 6, wherein an identical upper portion of the forward margin of each of the triangular sides of the enclosure is offset with respect to the associated lower portion of the forward margin, said movable-panel being fulcrumed at the respective steps joining at the upper and lower portions of the forward margin.

8. The dipper as claimed in claim 7, wherein said mounting means holding said forward panel comprises a resilient band encompassing the lower portion of the cup below said steps and below said access door.

9. The dipper according to claim 6, wherein the forward panel mounting means includes a pair of transversely spaced motion-limiting headed guide pins secured to said triangular sides and extending forwardly therefrom loosely within registering openings in the forward panel and forwardly therebeyond, the forwardly disposed heads of said pins being positioned in the path of movement of said movable panel.

10. In a normally closed cagelike minnow dipper of clear plastic material, the improvement comprising a flotation actuated door providing access to the cup of the dipper only when the cup is immersed in a body of liquid.

11. A minnow dipper comprising:
a five-sided minnow-tight cup formed generally in the shape of a downwardly-tapering wedge defining an enclosed wedge-shaped cavity;
said cup having a first wedge-shaped body portion including a rear wall, a pair of triangular side panels extending forwardly with the respective downwardly extending margins of said rear wall; and a top panel transversely connecting the respective upper margins of said triangular side panels and providing an upper closure member of said wedge-shaped cavity;
a second forward panel portion engaging a portion of the downwardly tapering forward edges of said triangular side panels, said forward panel portion normally providing a forward closure member of said cavity;
means fulcrumly mounting said forward panel portion for swingable movement on said body portion, an upper portion of said panel portion being inwardly offset and swingably movable into said cavity concurrently with a correspondingly swingable movement of the lower margins of said forward panel portion away from the adjacent lower margin of said rear wall to effect an opening leading downward from said cavity;
registering transversely spaced complementary recesses extending upwardly along the respective lower adjacent margins of said forward panel and said rear wall;

a passageway through the rear wall in communication with said cavity and a flotation-actuated door closing said passageway when said door is in an atmospheric environment, said door opening concurrently with the immersion of the cup of said dipper in a body of water.

* * * * *